(12) United States Patent
Wang et al.

(10) Patent No.: US 10,161,954 B2
(45) Date of Patent: Dec. 25, 2018

(54) MOTION DETECTING DEVICE AND DETECTING METHOD FOR REPETITIVE MOTION

(71) Applicant: HTC Corporation, Taoyuan (TW)

(72) Inventors: Jiaw-Chang Wang, Taoyuan (TW); I-Chien Liu, Taoyuan (TW); Shih-Yen Ku, Taoyuan (TW)

(73) Assignee: HTC Corporation, Taoyuan (TW)

( * ) Notice: Subject to any disclaimer, the term of this patent is extended or adjusted under 35 U.S.C. 154(b) by 273 days.

(21) Appl. No.: 15/003,817

(22) Filed: Jan. 22, 2016

(65) Prior Publication Data

US 2017/0212143 A1 Jul. 27, 2017

(51) Int. Cl.
*G01P 13/00* (2006.01)
*G06K 9/00* (2006.01)

(52) U.S. Cl.
CPC .......... *G01P 13/00* (2013.01); *G06K 9/00342* (2013.01); *G06K 9/00496* (2013.01)

(58) Field of Classification Search
CPC .......................... G01P 13/00; A63B 2024/0071
See application file for complete search history.

(56) References Cited

U.S. PATENT DOCUMENTS 9,619,039 B2 * 4/2017 Whelan ................... G06F 3/017
2009/0220125 A1    9/2009 Ren et al.

FOREIGN PATENT DOCUMENTS

TW    201129948 A    9/2011
TW    201600144 A    1/2016
TW     I533238 B    5/2016

OTHER PUBLICATIONS

Corresponding Taiwanese Office Action dated Apr. 6, 2017.

* cited by examiner

*Primary Examiner* — Yu-Hsi D Sun
(74) *Attorney, Agent, or Firm* — CKC & Partners Co., Ltd.

(57) ABSTRACT

A detecting method for repetitive motion includes receiving a plurality of accelerated velocities, receiving a plurality of angular velocities, determining a plurality of stationary points according to the accelerated velocities, determining a plurality of motion periods according to the stationary points, wherein the motion periods separately correspond to different sets of the angular velocities, and clustering the motion periods according to differences among the different sets of angular velocities corresponding to the motion periods.

12 Claims, 5 Drawing Sheets

MOTION DETECTING DEVICE AND DETECTING METHOD FOR REPETITIVE MOTION

BACKGROUND

Technical Field

The present disclosure relates to an electronic device, and a method. More particularly, the present disclosure relates to a motion detecting device and a detecting method for repetitive motion.

Description of Related Art

With advances in electronic technology, motion detecting devices are being increasingly used.

In sports training, a motion detecting device may be used to detect a repetitive motion, such as that used when swinging a golf club or shooting a basketball. Repetitive motion detection is typically achieved by using a machine learning approach. However, in the machine learning approach, it is necessary for the target motion to be well-defined, and to have a training dataset corresponding thereto. Therefore, such motion detection is suitable for only a limited number of different types of applications.

SUMMARY

One aspect of the present disclosure is related to a detecting method for repetitive motion. In accordance with one embodiment of the present disclosure, the method includes receiving a plurality of accelerated velocities, receiving a plurality of angular velocities, determining a plurality of stationary points according to the accelerated velocities, determining a plurality of motion periods according to the stationary points, wherein the motion periods separately correspond to different sets of the angular velocities, and clustering the motion periods according to differences among the different sets of angular velocities corresponding to the motion periods.

In accordance with one embodiment of the present disclosure, the step of determining the stationary points includes calculating norms of the accelerated velocities, and determining the stationary points according to whether the norms of the accelerated velocities are lower than a predetermined threshold.

In accordance with one embodiment of the present disclosure, the motion periods are intervals between each of two adjacent ones of the stationary points.

In accordance with one embodiment of the present disclosure, each of the motion periods corresponds to an identical number of the angular velocities.

In accordance with one embodiment of the present disclosure, the method further includes calculating an average period of the motion periods, and calculating a target number of the angular velocities by multiplying the average period by an average sample rate of the angular velocities, in which each of the motion periods corresponds to the target number of the angular velocities.

In accordance with one embodiment of the present disclosure, the step of clustering the motion periods includes calculating a plurality of accumulated angular displacements corresponding to each of the motion periods by integrating the angular velocities corresponding to each of the motion periods, and clustering the motion periods according to the accumulated angular displacements corresponding to the motion periods.

Another aspect of the present disclosure is related to a motion detecting device. In accordance with one embodiment of the present disclosure, the motion detecting device includes a communication component and a processing component. The communication component is electrically connected to the communication component. The communication component is configured for receiving a plurality of accelerated velocities and a plurality of angular velocities. The processing component is configured for determining a plurality of stationary points according to the accelerated velocities, determining a plurality of motion periods according to the stationary points, wherein the motion periods separately correspond to different sets of the angular velocities, and clustering the motion periods according to differences among the different sets of angular velocities corresponding to the motion periods.

In accordance with one embodiment of the present disclosure, the processing component is further configured for calculating norms of the accelerated velocities, and determining the stationary points according to whether the norms of the accelerated velocities are lower than a predetermined threshold.

In accordance with one embodiment of the present disclosure, the motion periods are intervals between each of two adjacent ones of the stationary points.

In accordance with one embodiment of the present disclosure, each of the motion periods corresponds to an identical number of the angular velocities.

In accordance with one embodiment of the present disclosure, the processing component is further configured for calculating an average period of the motion periods, and calculating a target number of the angular velocities by multiplying the average period by an average sample rate of the angular velocities; wherein each of the motion periods corresponds to the target number of the angular velocities.

In accordance with one embodiment of the present disclosure, the processing component is further configured for calculating a plurality of accumulated angular displacements corresponding to each of the motion periods by integrating the angular velocities corresponding to each of the motion periods, and clustering the motion periods according to the accumulated angular displacements corresponding to the motion periods.

Another aspect of the present disclosure is related to a motion detecting device. In accordance with one embodiment of the present disclosure, the motion detecting device includes a communication component and a processing component. The communication component is electrically connected to the communication component. The communication component is configured for receiving a plurality of accelerated velocities and a plurality of angular velocities. The processing component is configured for encoding the angular velocities into a sequence of motion codes, wherein the sequence of the motion codes comprises a plurality of sub-sequences of the motion codes, selecting a plurality of selected sub-sequences of the motion codes according to lengths of the sub-sequences of the motion codes and accelerated velocities, determining a plurality of motion periods respectively corresponding to the selected sub-sequences of the motion codes, wherein the motion periods separately correspond to different sets of the angular velocities, and clustering the motion periods according to differences among the different sets of angular velocities corresponding to the motion periods.

In accordance with one embodiment of the present disclosure, the processing component is further configured for determining a plurality of stationary points according to the accelerated velocities, calculating an estimated length of a repetitive motion according to the stationary points, and selecting the selected sub-sequences of the motion codes according to lengths of the sub-sequences of the motion codes and the estimated length of the repetitive motion.

In accordance with one embodiment of the present disclosure, the processing component is further configured for calculating norms of the accelerated velocities, and determining the stationary points according to whether the norms of the accelerated velocities are lower than a predetermined threshold.

In accordance with one embodiment of the present disclosure, the processing component is further configured for multiplying the estimated length of the repetitive motion by an average sample rate of the accelerated velocities, and selecting the selected sub-sequences of the motion codes that are within a selecting range calculated from a product of the estimated length of the repetitive motion and the average sample rate of the accelerated velocities.

In accordance with one embodiment of the present disclosure, the estimated length of the repetitive motion is an average length of the intervals between each of two adjacent ones of the stationary points.

In accordance with one embodiment of the present disclosure, the processing component is further configured for calculating norms of the accelerated velocities, calculating a plurality of second order differences of the norms of the accelerated velocities, and encoding each of the second order differences of the norms of the accelerated velocities into each of the motion codes of the sequence according to values of each of the second order differences of the norms of the accelerated velocities.

In accordance with one embodiment of the present disclosure, the processing component is further configured for constructing a suffix array of the sequence of the motion codes.

In accordance with one embodiment of the present disclosure, the processing component is further configured for calculating a plurality of accumulated angular displacements corresponding to each of the motion periods by integrating the angular velocities corresponding to each of the motion periods, and clustering the motion periods according to the accumulated angular displacements corresponding to the motion periods.

Through an application of one embodiment described above, the motion periods with a repetitive motion can be acquired.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
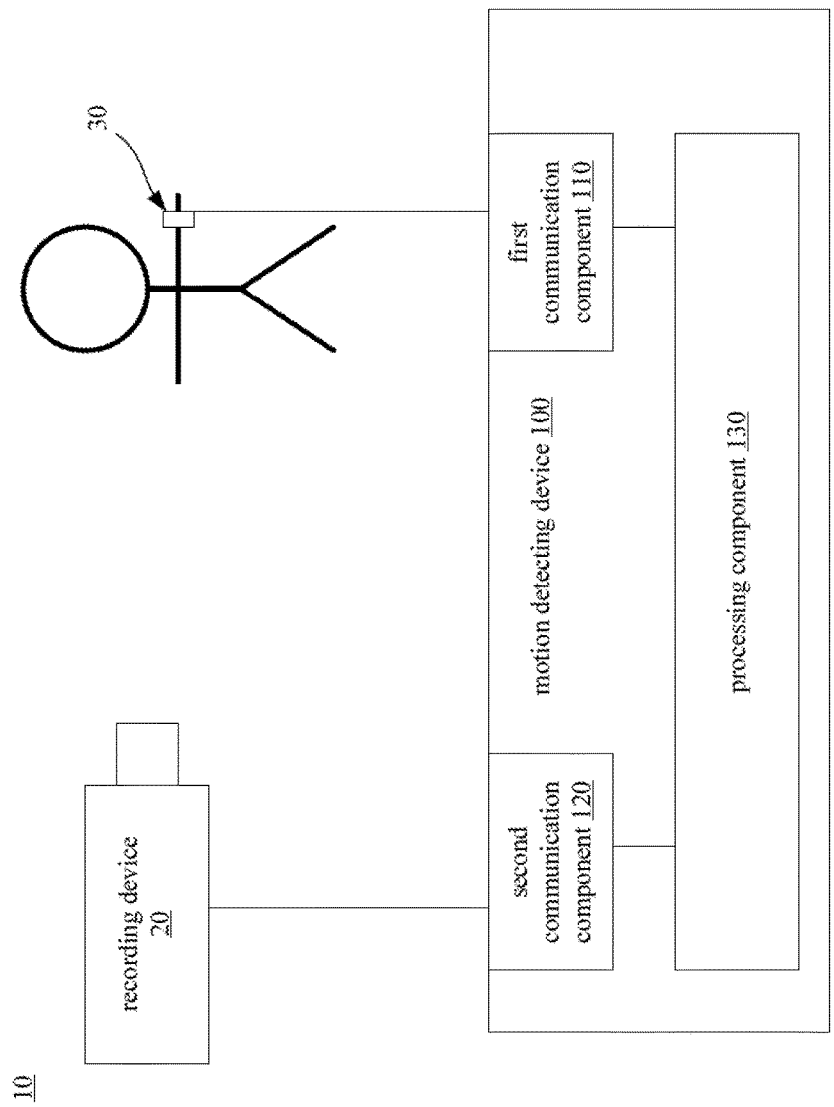
FIG. 1 is a schematic block diagram of a motion detecting system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description, herein, and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description, herein, and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a motion detecting device. In the paragraphs below, a computer or a server will be taken as an example to describe details of the motion detecting device. However, the present disclosure is not limited to the embodiment described below.

FIG. 1 is a schematic block diagram of a motion detecting system 10 in accordance with one embodiment of the present disclosure. In this embodiment, the motion detecting system 10 includes a recording device 20, a wearable device 30, and a motion detecting device 100. The motion detecting device 100 is electrically coupled (wired or wireless) to the recording device 20 and the wearable device 30. In one embodiment, the wearable device 30 is worn by a test subject, and is configured to provide motion information to the motion detecting device 100. In one embodiment, the recording device 20 is configured to record the motions of the test subject and generate a video film. In one embodiment, the recording device 20, the wearable device 30, and the motion detecting device 100 are synchronized.

In one embodiment, the recording device 20 is, for example, a camera. In one embodiment, the wearable device 30 is, for example, a smartwatch. The wearable device 30 may include a first sensor and a second sensor (not shown). The first sensor is configured to detect accelerated velocities of the wearable device 30. The second sensor configured to detect angular velocities of the wearable device 30. In one embodiment, the first sensor may be a linear accelerometer. In one embodiment, the second sensor may be a gyrometer. It is noted that, in an alternative embodiment, the first sensor and the second sensor may be disposed on different devices, and the present disclosure is not limited to the embodiment above.

In one embodiment, the motion detecting device 100 may include a first communication component 110, a second communication component 120, and a processing component 130. The processing component 130 is electrically connected to the first communication component 110 and the second communication component 120.

In one embodiment, each of the first and second communication components 120, 130 may be implemented by, for example, a wired or wireless communication circuit, but is not limited in this regard. In one embodiment, the processing component 130 can be realized by, for example, a central processor (CPU), a microprocessor, a programmable logic device (PLD), a field-programmable gate array (FPGA) or another suitable processing component, but is not limited in this regard. In addition, in one embodiment, the functions of the processing component 130 can be realized by a computing device implementing a computer program stored in a computer readable storage medium.

In one embodiment, the first communication component 110 is configured to communicate with the wearable device 30. In one embodiment, the first communication component 110 is configured to receive the accelerated velocities of the wearable device 30 from the first sensor and the angular velocities of the wearable device 30 from the second sensor, in which each of the accelerated velocities and the angular velocities has a timestamp to indicate the sample time or the received time thereof, so as to facilitate subsequent operations. In one embodiment, the second communication component 120 is configured to communicate with the recording device 20.

In one embodiment, the processing component 130 is configured to search motion periods of repetitive motions of the test subject according to the accelerated velocities and the angular velocities. Subsequently, the processing component 130 may receive the video film relevant to the motions of the test subject from the recording device 20 through the second communication component 120, and segment out film segments corresponding to the motion periods of the repetitive motions from the video film and allow a display to display the film segments corresponding to the repetitive motions.

In an alternative embodiment, the processing component 130 and the recording device 20 may separately provide information of the motion periods of the repetitive motions and the video film to a video cutting device, so that the video cutting device can segment out film segments corresponding to the motion periods of the repetitive motions from the video film and allow a display to display the film segments corresponding to the repetitive motions. In one embodiment, the video cutting device may be integrated into the recording device 20.

Through the operations described above, a user can observe his/her repetitive motions conveniently.

It should be noted that, in some embodiments, at least a portion of the functions of the processing component 130 may be integrated into the recording device 20 and/or the wearable device 30, and the present disclosure is not limited in the embodiment described above.

Details of the present disclosure are described in the paragraphs below with reference to a detecting method in FIG. 2. However, the present disclosure is not limited to the embodiment below.

It should be noted that the detecting method can be applied to a motion detecting device having a structure that is the same as or similar to the structure of the motion detecting device 100 shown in FIG. 1. To simplify the description below, in the following paragraphs, the embodiment shown in FIG. 1 will be used as an example to describe the detecting method according to an embodiment of the present disclosure. However, the present disclosure is not limited to application to the embodiment shown in FIG. 1.

It should be noted that, in some embodiments, the detecting method may be implemented as a computer program. When the computer program is executed by a computer, an electronic device, or the detecting device 100 in FIG. 1, this executing device performs the detecting method. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

In addition, it should be noted that in the operations of the following detecting method, no particular sequence is required unless otherwise specified. Moreover, the following operations also may be performed simultaneously or the execution times thereof may at least partially overlap.

Furthermore, the operations of the following detecting method may be added to, replaced, and/or eliminated as appropriate, in accordance with various embodiments of the present disclosure.

Figure 2:
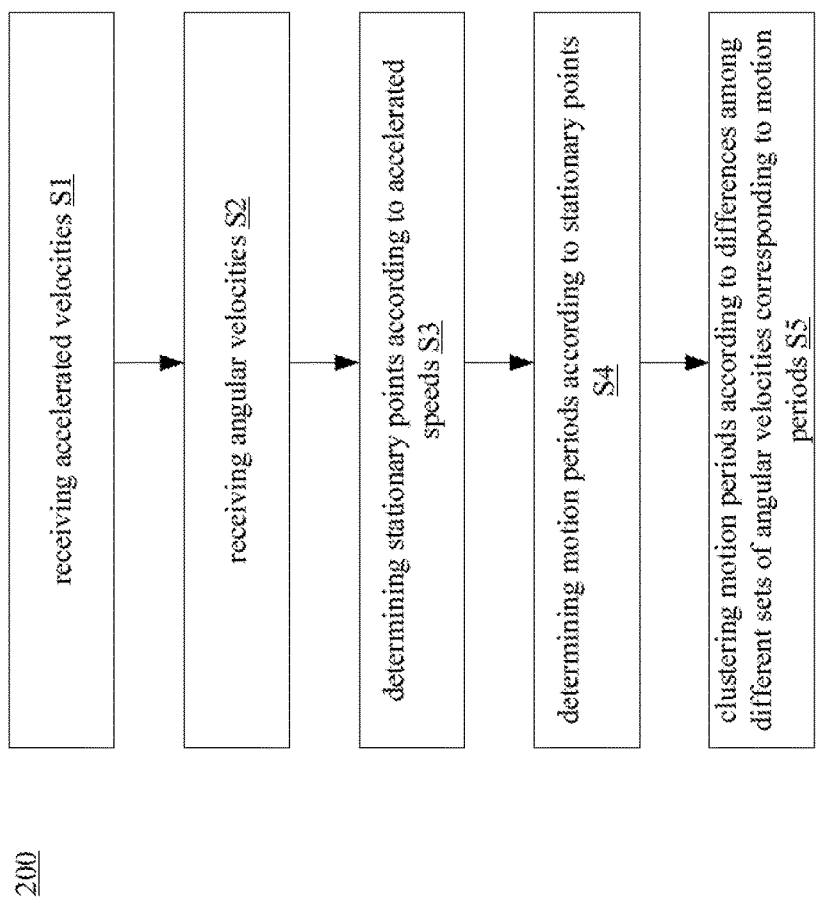
FIG. 2 is a flowchart of a detecting method in accordance with one embodiment of the present disclosure.

Reference is made to FIGS. 1 and 2. The detecting method 200 includes the operations below.

In step S1, the processing component 130 of the motion detecting device 100 receives a plurality of accelerated velocities of the wearable device 30 from the first sensor via the first communication component 110.

In step S2, the processing component 130 of the motion detecting device 100 receives a plurality of angular velocities of the wearable device 30 from the second sensor via the first communication component 110. It should be noted that, in some embodiments, step S1 and step S2 may be exchanged.

In step S3, the processing component 130 of the motion detecting device 100 determines a plurality of stationary points according to the accelerated velocities. In one embodiment, the processing component 130 may calculate norms of the accelerated velocities (e.g., norms of x-axis, y-axis, and z-axis accelerated velocities) and determine the stationary points according to whether the norms of the accelerated velocities are lower than a predetermined threshold. Under a condition that a norm of the accelerated speed is lower than the predetermined threshold, the time point of such an accelerated speed can be determined as the stationary point, and vice versa. That is, a stationary point may indicate a time point that the accelerated speed of the wearable device 30 is smaller than a certain threshold.

In step S4, the processing component 130 of the motion detecting device 100 determines a plurality of motion periods according to the stationary points. In one embodiment, the motion periods may be intervals between each of two adjacent ones of the stationary points. That is, each of the motion periods corresponds to a start stationary point and an end stationary point. In one embodiment, one of the motion periods may correspond to one motion (e.g., a swing) between two stationary points.

In one embodiment, the motion periods separately correspond to different sets of the angular velocities. In one embodiment, each of the motion periods corresponds to an identical number of the angular velocities. In one embodiment, the processing component 130 of the motion detecting device 100 may calculate an average period of the motion periods. Subsequently, the processing component 130 of the motion detecting device 100 may multiply the average period of the motion periods by an average sample rate of the angular velocities to calculate a target number of the angular velocities. In one embodiment, each of the motion periods corresponds to the target number of the angular velocities.

For example, if the target number of the angular velocities is 10, the processing component 130 may take 10 sequent angular velocities from a start stationary point of a motion period as the set of the angular velocities corresponding to the motion period.

In step S5, the processing component 130 of the motion detecting device 100 clusters the motion periods according to differences among the different sets of angular velocities corresponding to the motion periods.

In one embodiment, the processing component 130 of the motion detecting device 100 may integrate the angular velocities corresponding to each of the motion periods to calculate a plurality of accumulated angular displacements corresponding to each of the motion periods. Subsequently, the processing component 130 of the motion detecting device 100 can cluster the motion periods according to the accumulated angular displacements corresponding to the motion periods. For example, the processing component 130 may calculate the distances between the accumulated angular displacements corresponding to the motion periods to cluster the motion periods.

In one embodiment, after the motion periods are clustered, the processing component 130 of the motion detecting device 100 can find a largest group of the motion periods, which corresponds to the motions repeated the most. The processing component 130 can obtain the information of the motion periods (e.g., the start stationary points and the end stationary points) in the largest group.

In one embodiment, the processing component 130 may receive the video film from the recording device 20 and segment the video film to acquire the film segments corresponding to the motions repeated the most. Subsequently, the processing component 130 can allow a display to display the film segments corresponding to the motions repeated the most.

In one embodiment, the processing component 130 may segment out different film segments corresponding to the motion periods from the video film. Subsequently, the processing component 130 can sort the film segments according to the group size or another parameter of the corresponding motion periods.

It should be noted that, in an alternative embodiment, the segmenting function and/or the sorting function may be performed by the video cutting device described above, and the present disclosure is not limited in this regard.

Through the operations described above, a user can observe his/her certain motions conveniently.

To allow the disclosure to be more fully understood, an operative example is described in the paragraphs below, but the present disclosure is not limited to the example below.

Figure 3:
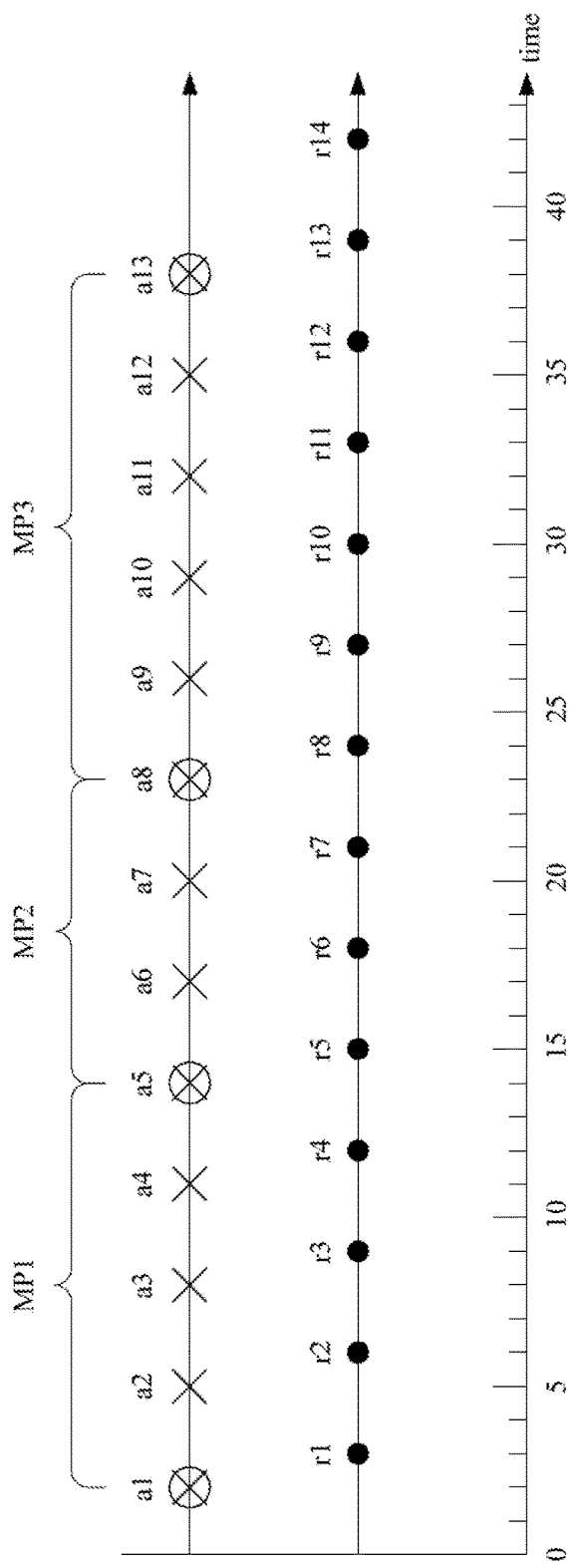
FIG. 3 illustrates an operative example of a detecting method in accordance with one embodiment of the present disclosure.

Reference is made to FIG. 3. In this operative example, points a1-a13 denote the time points of receiving or sampling the accelerated velocities of the wearable device 30, and points r1-r14 denote the time points of receiving or sampling the angular velocities of the wearable device 30. Points a1, a5, a8, and a13 denote the time points of the stationary points. In this operative example, there are 3 motion periods MP1-MP3 with lengths 12, 9, and 15, respectively. The average period of the motion periods is 12. The average sample rate of the angular velocities is 1/3. The product of the average period and the average sample rate of the angular velocities is 12*1/3=4. Therefore, the angular velocities received or sampled at points r1-r4 are taken as the set of the accelerated velocities corresponding to the motion period MP1, the angular velocities received or sampled at points r5-r8 are taken as the set of the accelerated velocities corresponding to the motion period MP2, and the angular velocities received or sampled at points r8-r11 are taken as the set of the accelerated velocities corresponding to the motion period MP3.

The processing component 130 may integrate the angular velocities received or sampled at points r1-r4 to calculate a first accumulated angular displacement corresponding to the motion period MP1, integrate the angular velocities received or sampled at points r5-r8 to calculate a second accumulated angular displacement corresponding to the motion period MP2, and integrate the angular velocities received or sampled at points r8-r11 to calculate a third accumulated angular displacement corresponding to the motion period MP3. Subsequently the processing component 130 can cluster the motion periods MP1-MP3 according to the difference between the first angular displacement, the second angular displacement, and the third angular displacement.

Another embodiment of the present disclosure is described in the paragraphs below with reference to a detecting method in FIG. 4. However, the present disclosure is not limited to the embodiment below.

It should be noted that the detecting method can be applied to a motion detecting device having a structure that is the same as or similar to the structure of the motion detecting device 100 shown in FIG. 1. To simplify the description below, in the following paragraphs, the embodiment shown in FIG. 1 will be used as an example to describe the detecting method according to an embodiment of the present disclosure. However, the present disclosure is not limited to application to the embodiment shown in FIG. 1.

It should be noted, that, in some embodiments, the detecting method may be implemented as a computer program. When the computer program is executed by a computer, an electronic device, or the detecting device 100 in FIG. 1, this executing device performs the detecting method. The computer program can be stored in a non-transitory computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

In addition, it should be noted that in the operations of the following detecting method, no particular sequence is required unless otherwise specified. Moreover, the following operations also may be performed simultaneously or the execution times thereof may at least partially overlap.

Furthermore, the operations of the following detecting method may be added to, replaced, and/or eliminated, as appropriate, in accordance with various embodiments of the present disclosure.

Figure 4:
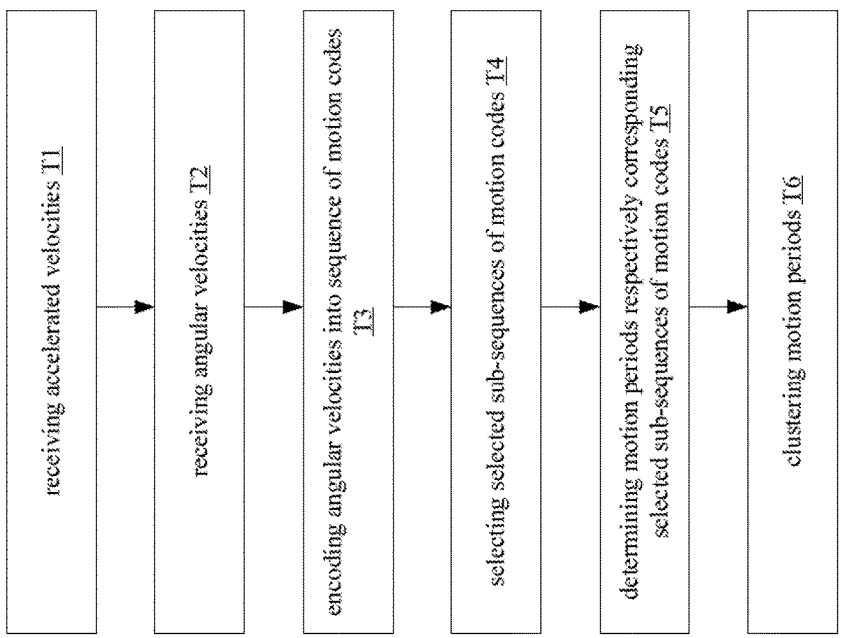
FIG. 4 is a flowchart of a detecting method in accordance with another embodiment of the present disclosure.

Reference is made to FIGS. 1 and 4. The detecting method 400 includes the operations below.

In step T1, the processing component 130 of the motion detecting device 100 receives a plurality of accelerated, velocities of the wearable device 30 from the first sensor via the first communication component 110.

In step T2, the processing component 130 of the motion detecting device 100 receives a plurality of angular velocities of the wearable device 30 from the second sensor via the first communication component 110.

In step T3, the processing component 130 of the motion detecting device 100 encodes the angular velocities into a sequence of motion codes. In one embodiment, the sequence of the motion codes comprises a plurality of sub-sequences of the motion codes.

In one embodiment, the processing component 130 of the motion detecting device 100 calculates norms of the accelerated velocities. Subsequently, the processing component 130 of the motion detecting device 100 calculates a plurality of second order differences of the norms of the accelerated velocities. Subsequently, the processing component 130 of the motion detecting device 100 encodes each of the second order differences of the norms of the accelerated velocities into each of the motion codes of the sequence according to values of each of the second order differences of the norms of the accelerated velocities.

For example, in a case that one of the second order differences of the norms of the accelerated velocities is greater than or equal to an upper threshold (e.g., +2), the one of the second order differences of the norms of the accelerated velocities is encoded as a first type of the motion codes (e.g., a letter "a"). In a case that the one of the second order differences of the norms of the accelerated velocities is less than or equal to a lower threshold (e.g., −2), the one of the second order differences of the norms of the accelerated velocities is encoded as a second type of the motion codes (e.g., a letter "b"). In a case that the one of the second order differences of the norms of the accelerated velocities is lower than the upper threshold and greater than the lower threshold, the one of the second order differences of the norms of the accelerated velocities is encoded as a third type of the motion codes (e.g., a letter "c"). It should be noted that although 3 types of the motion codes are taken as a descriptive example, the present disclosure is not limited to such an embodiment. Other numbers of types of the motion codes are within the contemplated scope of the present disclosure.

In one embodiment, a norm of an accelerated velocity received or sampled at time point "p" may be denoted by $F_p$. A first order difference of the norms of the accelerated velocities may be denoted by $\Delta F_p$, which is equal to $F_p - F_{p-1}$. A second order difference of the norms of the accelerated velocities may be denoted by $\Delta^2 F_p$, which is equal to $\Delta F_p - \Delta F_{p-1}$.

In one embodiment, the processing component 130 of the motion detecting device 100 may construct a suffix array of the sequence of the motion codes to facilitate searching repetitive patterns.

In step T4, the processing component 130 of the motion detecting device 100 selects a plurality of selected sub-sequences of the motion codes according to lengths of the sub-sequences of the motion codes and the accelerated velocities.

In one embodiment, the processing component 130 of the motion detecting device 100 may determine a plurality of stationary points according to the accelerated velocities, and calculate an estimated length of a repetitive motion according to the stationary points. Subsequently, the processing component 130 of the motion detecting device 100 may select the selected sub-sequences of the motion codes according to lengths of the sub-sequences of the motion codes and the estimated length of the repetitive motion.

In one embodiment, the estimated, length of the repetitive motion is an average length of the intervals between each of two adjacent ones of the stationary points. Details of the stationary points can be ascertained by referring to the above paragraphs, and a description, in this regard will not be repeated herein.

In one embodiment, the processing component 130 of the motion detecting device 100 may multiply the estimated length of the repetitive motion by an average sample rate of the accelerated velocities, and select the selected sub-sequences of the motion codes that are within a selecting range calculated from a product of the estimated length of the repetitive motion and the average sample rate of the accelerated velocities.

For example, an upper bound of the selecting range may be equal to the product of the estimated length of the repetitive motion and the average sample rate of the accelerated velocities multiplied by 1.5 the upper bound=the average sample rate*1.5*the estimated length), and an upper bound of the selecting range may be equal to half of the product of the estimated length of the repetitive motion and the average sample rate of the accelerated velocities (the lower bound=the average sample rate*0.5*the estimated length). The code number of the selected sub-sequences of the motion codes is within the upper bound and the lower bound.

In step T5, the processing component 130 of the motion detecting device 100 determines a plurality of motion periods respectively corresponding to the selected sub-sequences of the motion codes. In one embodiment, the motion periods separately correspond to different sets of the angular velocities. In one embodiment, the motion periods may correspond to a different number of the angular velocities.

In step T6, the processing component 130 of the motion detecting device 100 clusters the motion periods according to differences among the different sets of angular velocities corresponding to the motion periods. Details of this operation can be ascertained with reference to the step S5 described above, and a description in this regard will not be repeated herein.

In one embodiment, after the motion periods are clustered, the processing component 130 of the motion detecting device 100 can find a largest group of the motion periods, which corresponds to the motions repeated the most. The processing component 130 can obtain the information of the motion periods (e.g., the start stationary points and the end stationary points) in the largest group.

In one embodiment, the processing component 130 may receive the video film from the recording device 20 and segment the video film to acquire the film segments corresponding to the motions repeated the most. Subsequently, the processing component 130 can allow a display to display the film segments corresponding to the motions repeated the most.

In one embodiment, the processing component 130 may segment out different film segments corresponding to the motion periods from the video film. Subsequently, the processing component 130 can sort the film segments according to the group size or another parameter of the corresponding motion periods.

It should be noted that, in an alternative embodiment, the segmenting function and/or the sorting function may be performed by the video cutting device described above, and the present disclosure is not limited in this regard.

It is also noted that, in the detecting method 300, a user may lengthen or shorten some certain film segments by adding or subtracting one or more motion code(s) into/from corresponding sub-sequences. For example, when film segments corresponding to a sub-sequence "aabbc" are displayed, the user can lengthen or shorten these film segments by changing the sub-sequence into, for illustration, "aabbcc" (if such a sub-sequence exists) or "aabb".

Through the operations described above, a user can observe his/her certain motions conveniently.

To allow the disclosure to be more fully understood, an operative example is described in the paragraphs below, but the present disclosure is not limited to the example below.

Figure 5:
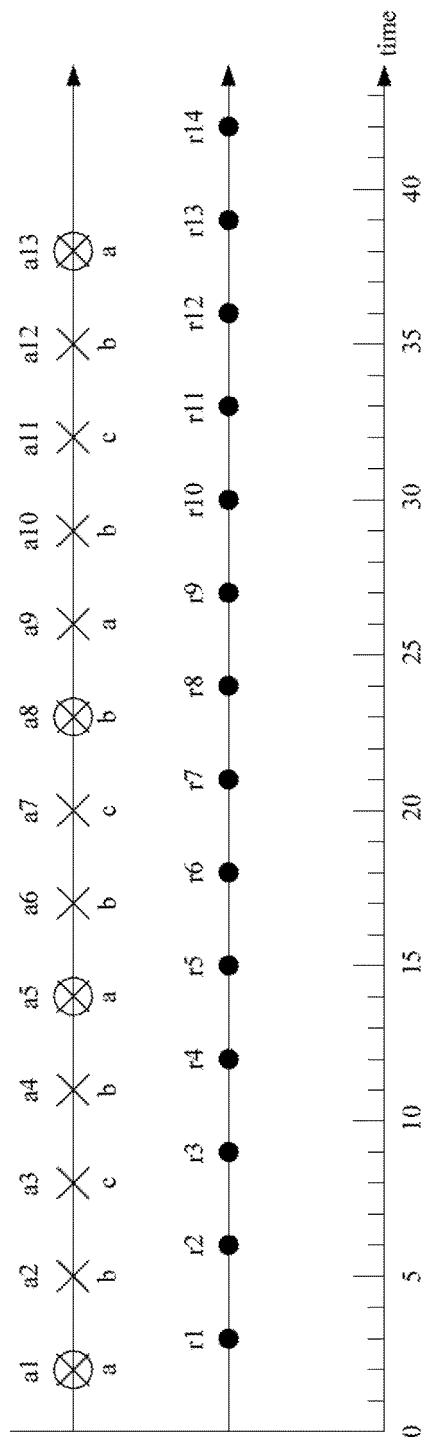
FIG. 5 illustrates an operative example of a detecting method in accordance with another embodiment of the present disclosure.

Reference is made to FIG. 5. In this operative example, points a1-a13 denote the time points of receiving or sampling the accelerated velocities of the wearable device 30, and points r1-r14 denote the time points of receiving or sampling the angular velocities of the wearable device 30. Points a1, a5, a8, and a13 denote the time points of the stationary points. In this operative example, points a1-a13 are encoded into a sequence of motion codes "abcbabcbabcba". There are sub-sequences of the motion codes "a," "ab," "abc," "abcb," "abcba," and so on.

The estimated length of a repetitive motion is (15+9+12)/3=12. The average sample rate of the accelerated velocities is 1/3. The upper bound of the selecting range is 12*(1/3)*1.5=6. The lower bound of the selecting range is 12*(1/3)*0.5=2. The selected sub-sequences of the motion codes with the number of codes within the selecting range are "ab," "abc," "abcb," "abcba," "abcbab," "bc," "bcb," "bcba," "bcbab," "cbabc," "a," "bab," "babc," "babcb," "babcba," "cb," "cba," "cbab," "cbabc," and "cbabcb".

The sub-sequence "babc" corresponds to the motion periods with times 11-20 and 23-32, the sub-sequence "abcb" corresponds to the motion periods with times 2-11, 14-23, and 26-35, and the rest may be deduced by analogy. The angular velocities received or sampled at points r4-r6 are taken as the set of the accelerated velocities corresponding to the motion period with time 11-20, the angular velocities received or sampled at points r8-r10 are taken as the set of the accelerated velocities corresponding to the motion period with time 23-32, and the rest may be deduced by analogy.

Subsequently, the processing component 130 can integrate the angular velocities corresponding to each of the motion periods corresponding to the selected sub-sequences of the motion codes, and cluster these motion periods accordingly.

Although the present invention has been described in considerable detail with reference to certain embodiments thereof, other embodiments are possible. Therefore, the scope of the appended claims should not be limited to the description of the embodiments contained herein.

What is claimed is:

1. A detecting method for repetitive motion comprising:
receiving a plurality of accelerated velocities;
receiving a plurality of angular velocities;
determining a plurality of stationary points according to the accelerated velocities;
determining a plurality of motion periods between the stationary points, wherein the motion periods separately correspond to different sets of the angular velocities;
clustering the motion periods into different groups according to differences among the different sets of angular velocities corresponding to the motion periods; and
generating a film with a first group of the motion periods among the different groups.

2. The detecting method for repetitive motion as claimed in claim 1, wherein the step of determining the stationary points comprises:
calculating norms of the accelerated velocities; and
determining the stationary points according to whether the norms of the accelerated velocities are lower than a predetermined threshold.

3. The detecting method for repetitive motion as claimed in claim 1, wherein the motion periods are intervals between each of two adjacent ones of the stationary points.

4. The detecting method for repetitive motion as claimed in claim 1, wherein each of the motion periods corresponds to an identical number of the angular velocities.

5. The detecting method for repetitive motion as claimed in claim 1 further comprising:
calculating an average period of the motion periods; and
calculating a target number of the angular velocities by multiplying the average period by an average sample rate of the angular velocities, wherein each of the motion periods corresponds to the target number of the angular velocities.

6. The detecting method for repetitive motion as claimed in claim 1, wherein the step of clustering the motion periods comprises:
calculating a plurality of accumulated angular displacements corresponding to each of the motion periods by integrating the angular velocities corresponding to each of the motion periods; and
clustering the motion periods according to the accumulated angular displacements corresponding to the motion periods.

7. A motion detecting device comprising:
a communication component configured for receiving a plurality of accelerated velocities and a plurality of angular velocities; and
a processing component electrically connected to the communication component, wherein the processing component is configured for:
determining a plurality of stationary points according to the accelerated velocities;
determining a plurality of motion periods between the stationary points, wherein the motion periods separately correspond to different sets of the angular velocities;
clustering the motion periods into different groups according to differences among the different sets of angular velocities corresponding to the motion periods; and generating a film with a first group of the motion periods among the different groups.

8. The motion detecting device as claimed in claim 7, wherein the processing component is further configured for:
- calculating norms of the accelerated velocities; and
- determining the stationary points according to whether the norms of the accelerated velocities are lower than a predetermined threshold.

9. The motion detecting device as claimed in claim 7, wherein the motion periods are intervals between each of two adjacent ones of the stationary points.

10. The motion detecting device as claimed in claim 7, wherein each of the motion periods corresponds to an identical number of the angular velocities.

11. The motion detecting device as claimed in claim 7, wherein the processing component is further configured for:
- calculating an average period of the motion periods; and
- calculating a target number of the angular velocities by multiplying the average period by an average sample rate of the angular velocities, wherein each of the motion periods corresponds to the target number of the angular velocities.

12. The motion detecting device as claimed in claim 7, wherein the processing component is further configured for:
- calculating a plurality of accumulated angular displacements corresponding to each of the motion periods by integrating the angular velocities corresponding to each of the motion periods; and
- clustering the motion periods according to the accumulated angular displacements corresponding to the motion periods.

* * * * *